Dec. 8, 1970 R. W. DANIELS 3,546,640

NONRECIPROCAL TRANSISTOR NETWORK

Filed Feb. 26, 1969

INVENTOR
R. W. DANIELS
BY Leonard D. Arnold
ATTORNEY

United States Patent Office 3,546,640

Patented Dec. 8, 1970

3,546,640

NONRECIPROCAL TRANSISTOR NETWORK

Richard W. Daniels, Andover, Mass., assignor to Bell Telephone Laboratories, Incorporated, Murray Hill and Berkeley Heights, N.J., a corporation of New York Filed Feb. 26, 1969, Ser. No. 802,417

Int. Cl. H03h *7/44;* H03f *3/00*

U.S. Cl. 333—80 5 Claims

ABSTRACT OF THE DISCLOSURE

Two alternative gyrator circuit configurations are formed from a basic four-port network which contains three transistors. In the basic network the collector of a first transistor is connected directly to the base of a second transistor and the collector of the second transistor is connected directly to the base of a third transistor, while the emitter of the first transistor is connected directly to the emitter of the third transistor. In both alternative circuits two of the ports are terminated in resistors and two are used as the input and output ports which produce gyrator action.

BACKGROUND OF THE INVENTION

This invention relates generally to nonreciprocal electric networks and more particularly to transistor gyrator circuits.

Broadly speaking, network synthesis may be defined as "the methods by which an electric network can be formed to realize a prescribed characteristic." (K. L. Su, Active Network Synthesis, page 1, McGraw-Hill, Inc., 1965.) In the past, network synthesis was based on the existence of simple circuit elements, such as resistors, capacitors, inductors and transformers. But, with the advent of modern synthesis techniques many new elements having specialized electrical characteristics were developed. Some of these, such as the negative resistance. the nullator, norator, circulator and gyrator are described simply by Su at pages 8–39 in the above-mentioned book.

Often new elements for electric networks are defined theoretically and mathematically before a realizable physical representation is found. The gyrator, for one, was first described theoretically as early as 1948 by B. Tellegen in "The Gyrator, a New Electric Network Element," Philips Research Reports, vol. 3, No. 2, pp. 81–101 (1948).

Since that time a number of patents have issued disclosing various transistor circuits which approximated the characteristics of the theoretical gyrator. The present invention is an inexpensive alternative transistor network which more closely approximates the characteristics of the theoretical gyrator than many circuits in the prior art. Because of its relatively high quality the present gyrator circuit offers the designer greater latitude in using such circuits in practical networks.

The gyrator is a four-terminal, two-port network which may be defined by the following pair of equations:

$$V_1=I_2R_1 \quad (1)$$

$$V_2=I_1R_2 \quad (2)$$

where $I_1$ is the current into an $V_1$ is the voltage across the two terminals consituting one port, and $I_2$ is the current into and $V_2$ is the voltage across the two terminals constituting the second port. As may be noted from Equations 1 and 2, the gyrator associates its name with the fact that it "gyrates" an input voltage into an output current and vice versa.

In an ideal gyrator the input impedance, measured at the input with the output terminal open-circuited, and the output impedance, measured at the output with the input terminals open-circuited, are equal to zero. $R_1$ and $R_2$ in Equations 1 and 2 above are transfer impedances whose product determines the gyration constant K. In an ideal passive gyrator circuit as defined by Tellegen in the above-cited article, the transfer impedances $R_1$ and $R_2$ are equal but in general they may be unequal.

The gyrator is important in network synthesis because it is one of the simplest and most basic nonreciprocal networks from which other nonreciprocal networks such as the circulator can be formed. In simple terms, a network is reciprocal when a voltage source inserted in one part of the network produces a current at some other part of the network such that the ratio of the applied voltage to the measured current, called the transfer impedance, will be the same if the relative positions of the driving source and the measured effect are reversed. Electrical networks which contain only resistors. capacitors, inductors and transformers generally are the reciprocal networks. The gyrator, however, is always nonreciprocal since the transfer impedance for one direction of propagation always differs in sign from that for propagation in the reverse direction, as demonstrated by the different signs in Equations 1 and 2 above. A gyrator may be further nonreciprocal in that the magnitude of the transfer impedances, $R_1$ and $R_2$, in Equations 1 and 2 may in general be unequal.

In practical application, the gyrator is important as a positive impedance inverter. That is, if an impedance $+Z$ is connected between one pair of terminals, the impedance measured at the other terminals is proportional to $+1/Z$. Thus, for example, if the gyrator network defined by Equations 1 and 2 is terminated with an output impedance $Z_{out}$, the input impedance will be defined by Equation 3:

$$Z_{in}=\frac{R_1R_2}{Z_{out}}=\frac{K}{Z_{out}} \quad (3)$$

where K is again the gyration constant. As a result, a capacitor with an impedance $1/j\omega C$ can be made to appear as an inductor with an impedance $j\omega KC$ through the use of a gyrator circuit.

The ability to substitute a capacitor and a gyrator for an inductor is signficant in the integrated circuit art because the inductor has been especially difficult to realize with known integrated techniques. Also, even in conventional circuits large and expensive coils have been required in order to provide inductance at low frequencies. Thus in many circuit applications it may be less expensive and more efficient to use the present gyrator circuit with a capacitor than to use the simple elemental inductor.

It is therefore the object of the present invention to provide an inexpensive transistor network which produces gyrator action and is capable of simulating high quality inductors.

SUMMARY OF THE INVENTION

The present invention is a gyrator network which contains three transistors each having emitter, collector and base electrodes. In the basic network, the collector of a first transistor is connected directly to the base of a second transistor and the collector of the second transistor is connected directly to the base of the third transistor, while the emitter of the first transistor is connected directly to the emitter of the third transistor.

This basic network embodying the principles of the invention contains four ports. Two alternative two-port configurations are formed from it. In both alternatives two of the ports are terminated in resistors and two are used as the input and output ports which produce gyrator action.

In one embodiment of the invention the two resistors are connected between the collector and base electrodes of the first and third transistors. In the other embodiment of the invention the first resistor is connected from the base of the first transistor to the collector of the third transistor and the second resistor is connected from the emitter of the second transistor to the emitters of the first and third transistors. In the first embodiment of the invention the input terminals are connected to the base of the first transistor and the collector of the third transistor, with one output terminal connected to the emitter of the second transistor and the second output terminal connected to the emitters of the first and third transistors. In the second embodiment of the invention, one input terminal is connected to the collector of the second transistor and the base of the third transistor while the other input terminal is connected to the collector of the third transistor. The first output terminal is connected to the collector of the first transistor and the base of the second transistor and the second output terminal is connected to the base of the first transistor.

BRIEF DESCRIPTION OF THE DRAWINGS

This invention will be more fully comprehended from the following detailed description taken in conjunction with the drawings in which.

DETAILED DESCRIPTION

Figure 1:
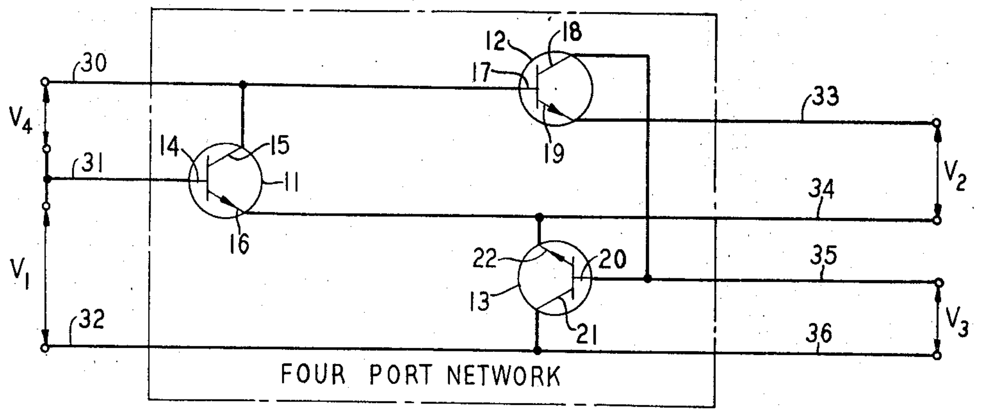
FIG. 1 is a schematic diagram of a basic four-port network from which the alternative embodiments of the invention are formed.

FIG. 1 shows a basic four-port network from which the alternative gyrator circuits embodying the present invention are formed. The only active elements are transistors 11, 12 and 13, each having emitter, collector and base electrodes. Collector 15 of transistor 11 is connected directly to base 17 of transistor 12 and emitter 16 of transistor 11 is connected directly to emitter 22 of transistor 13, while collector 18 of transistor 12 is connected directly to base 20 of transistor 13.

The four ports of the network shown in FIG. 1 are defined by terminals 30, 31, 32, 33, 34, 35 and 36. Signal voltage $V_1$ appears across terminals 31 and 32 which are respectively connected to base 14 of transistor 11 and collector 21 of transistor 13. Voltage $V_2$ appears across terminals 33 and 34 which are respectively connected to the emitter 19 of transistor 12 and to emitter electrodes 16 and 22 of transistors 11 and 13. Voltage $V_3$ appears across terminals 35 and 36 which are connected to base 20 of transistor 13 and collector 18 of transistor 12 and to collector 21 of transistor 13, respectively. Voltage $V_4$ appears across terminals 30 and 31 which are connected to collector 15 of transistor 11 and base 17 of transistor 12 and to base 14 of transistor 11, respectively.

Figure 2:
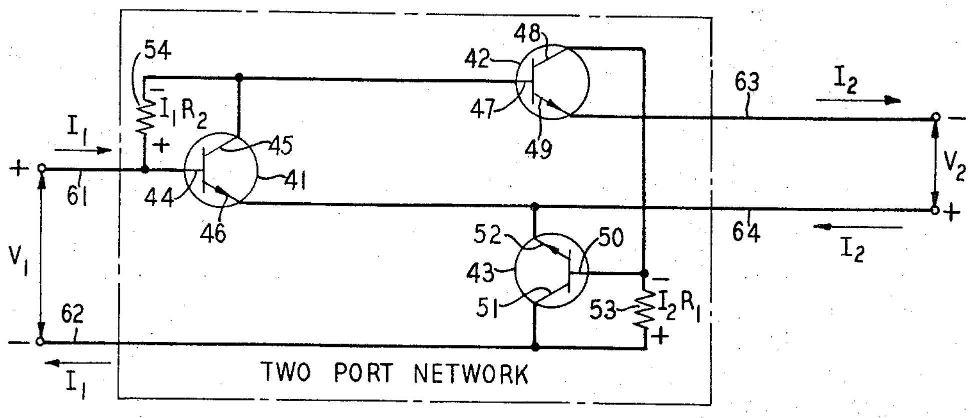
FIG. 2 is a schematic diagram of a gyrator circuit embodying the invention.
Figure 3:
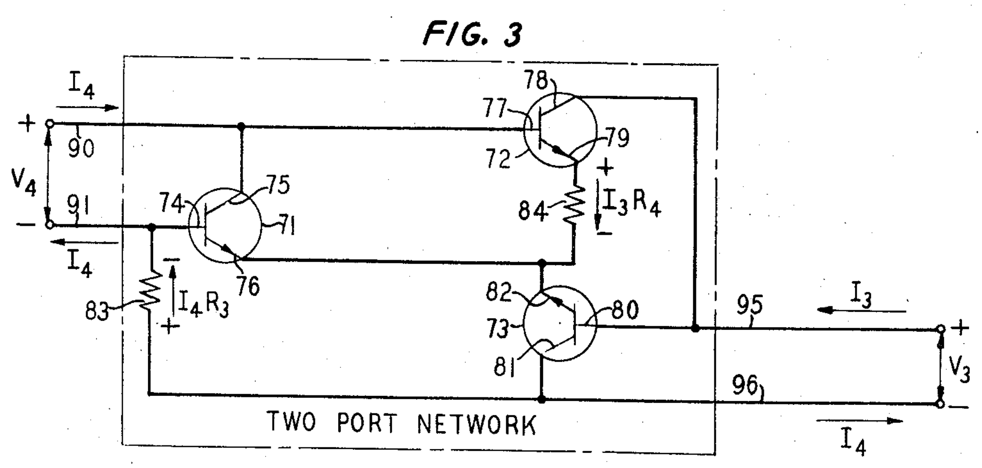
FIG. 3 is a schematic diagram of an alternative gyrator circuit embodying the invention.

The basic four-port network shown in FIG. 1 yields the alternative circuit configurations shown in FIGS. 2 and 3. In the embodiment of the invention shown in FIG. 2, resistors are connected across terminal pairs 30, 31 and 35, 36. In the alternative embodiment shown in FIG. 3, resistors are connected across terminal pairs 31, 32 and 33, 34. Each of these alternative circuits, as will be shown in detail below, produces gyrator action in accordance with Equations 1 and 2 defined above.

The gyrator circuit shown in FIG. 2 is a two-port network. Input signal voltage $V_1$ is applied to input terminals 61 and 62 and output signal voltage $V_2$ is measured across output terminals 63 and 64. Each of these terminals 61, 62, 63 and 64 corresponds respectively to terminals 31, 32, 33 and 34 shown in FIG. 1. Similarly, transistors 41, 42, and 43 and electrodes 44, 45, 46, 47, 48, 49, 50, 51 and 52, shown in FIG. 2, correspond to transistors 11, 12 and 13 and electrodes 14, 15, 16, 17, 18, 19, 20, 21 and 22 shown in FIG. 1. Resistor 53 having resistance $R_1$ is connected between base 50 and collector 51 of transistor 43 and resistor 54 having resistance $R_2$ is connected from base 44 to collector 45 of transistor 41. In accordance with the general scheme described above, it may be seen that resistors 53 and 54 are connected to the identical electrodes that terminals 30, 31, 35 and 36 are connected in FIG. 1.

Current $I_1$ in FIG. 2 is shown for reference purposes flowing into the network at terminal 61 while current $I_2$ is shown flowing into the network at terminal 64. The polarity of signal voltages $V_1$ and $V_2$ is chosen to correspond to the direction of current flow. The direction of current flow and the polarity of the signal voltages correspond to the convention adopted in Equations 1 and 2 described above. It should be understood, of course, that other conventions could be adopted and other variations made without material change in the analysis following below.

Turning now to FIG. 3 it may be seen that the two-port gyrator network shown therein follows a pattern similar to that shown in FIG. 2. Specifically, input terminals 95 and 96 and output terminals 90 and 91 correspond to terminals 35, 36, 30 and 31 in FIG. 1. Input voltage $V_3$ is applied across terminals 95 and 96 in FIG. 3 and output voltage $V_4$ is measured across terminals 90 and 91. Transistors 71, 72 and 73 in FIG. 3 correspond to transistors 11, 12 and 13 in FIG. 1 and electrodes 74, 75, 76, 77, 78, 79, 80, 81 and 82 in FIG. 3 correspond to electrodes 14, 15, 16, 17, 18, 19, 20, 21 and 22 in FIG. 1. Resistor 83 having a resistance $R_3$ is connected between base 74 of transistor 71 and collector 81 of transistor 80, and resistor 84 having resistance $R_4$ is connected between emitter 79 of transistor 72 and emitters 76 and 82 of transistors 71 and 73. Resistors 83 and 84 are connected to the identical terminals that input and output terminals 31, 32, 33, 34 were connected in FIG. 1. In addition, in FIG. 3 input current $I_3$ is applied into the network at terminal 95 and output current $I_4$ is measured into the network at output terminal 90. The polarity of voltages $V_3$ and $V_4$ is chosen to correspond to the flow of current. Again the direction of current flow and the polarity of the signal voltage are chosen to correspond to the convention adopted for Equations 1 and 2 above.

The following detailed analysis shows that the alternative circuits in FIGS. 2 and 3 satisfy Equations 1 and 2 above and produce gyrator action.

Assume ideal transistors are used, i.e., that the base current $I_b$ equals zero, that the voltage between the base and emitter electrodes $V_{be}$ equals zero, and that the emitter current $I_e$ is equal to the collector current $I_c$. By convention the direction of the arrows on the emitter electrodes of transistors 41, 42, 43, 71, 72 and 73 are defined to be in the direction in which direct current will flow through these electrodes. However, once the transistor is properly biased in the operating range, alternating signal current may be assumed to flow in either direction from the emitter to the collector with the only constraint being that $I_e$ equals $I_c$ as defined above for the ideal transistor. The biasing circuitry is not shown in FIGS. 2 and 3, but the embodiments disclosed may be biased by a variety of alternative means which are well known in the art. Accordingly, for clarity such circuitry has been omitted and it may be assumed that the transistors are properly biased.

As indicated above, the embodiment of the invention shown in FIG. 2 is a two-port network with a pair of input and output terminals. Input voltage $V_1$ is supplied across input terminals 61 and 62 and output voltage $V_2$ is measured across output terminals 63 and 64 while currents $I_1$ and $I_2$ are assumed to flow into the network at terminals 61 and 64, respectively, in accordance with the convention adopted in Equations 1 and 2 above. Thus, since $I_b$ for transistor 41 equals zero, all of current $I_1$ must flow through resistor 54, with resistance $R_2$, causing a voltage drop $I_1R_2$ across the resistor 54 in the direction as shown. Further, since voltage $V_{be}$ for transistors 41 and 42 is equal to zero, the voltage at output terminal 63 may be traced through transistor 42 to collector 45 of transistor 41 and the voltage of output terminal 64 may be traced through emitter 46 to base 44 of transistor 41 so that $V_2$ is equal to the voltage drop across resistor 54. As a result, $V_2=I_1R_2$ and Equation 2 is satisfied.

Similarly, since $V_{be}$ for transistors 41 and 43 is equal to zero, the voltage at input terminal 61 may be traced through the base and emitter terminals of transistors 41 and 43 so that $V_1$ appears across resistor 53. Since $I_c$ of transistor 42 equals $I_e$, all of current $I_2$ flowing out of the network at output terminals 63 flows through transistor 42 from collector 48 to emitter 49. Since $I_b=0$ for transistor 43 all of current $I_2$ at collector 48 must flow through resistor 53, with resistance $R_1$, thereby causing a voltage drop $I_2R_1$ in the direction as shown. Because voltage $V_1$ appears across resistor 53 in the opposite direction, $V_1=-I_2R_1$ and Equation 1 is satisfied. Thus, the circuit shown in FIG. 2 functions as a gyrator.

The circuit shown in FIG. 3 is an alternative gyrator circuit embodying the principles of the invention. Input voltage $V_3$ is supplied across terminals 95 and 96 and output voltage $V_4$ is measured across output terminals 90 and 91 in an analogous manner to the voltages $V_1$ and $V_2$ shown in FIG. 2. Voltage $V_3$ is considered the input voltage and voltage $V_4$ is considered the output voltage in order to maintain the direction of gyration in a manner consistent with that used for FIG. 2. It may be noted at this point that in both of the circuits shown in FIGS. 2 and 3 the output terminals may alternatively be considered the input terminals and vice versa without any material change in the analysis or in Equations 1 and 2. The reversal of the input and output ports merely causes a change in the direction of gyration which is reflected in Equations 1 and 2 by an interchange of the subscripts 1 and 2 in the voltage and current terms. The new set of equations with interchanged subscripts still defines a gyrator circuit since no material change has been made.

By adopting the analysis used in FIG. 2 it may be seen that since $V_{be}$ for transistors 71 and 72 in FIG. 3 is equal to zero, input terminals 90 and 91 may be traced through transistors 71 and 72 so that voltage $V_4$ appears across resistor 84. Since $I_b$ of transistor 73 is equal to zero, all of current $I_3$ at input terminal 95 flows to collector 78 of transistor 72. Since $I_c$ of transistor 72 equals $I_e$, current $I_3$ flowing into the network at terminal 95 flows through transistor 72 and through resistor 84 to emitters 76 and 82, thereby causing a voltage drop across resistor 84 in the direction as shown. Since $V_4$ appears across resistor 84 in the same direction as that generated by current $I_3$, voltage $V_4$ is equal to $I_3R_4$. It may be readily seen that this equation is equivalent to Equation 2.

Similarly, since $V_{be}$ of transistors 73 and 71 is equal to zero, input terminal 95 may be traced through transistors 73 and 71 to base electrode 74 so that $V_3$ appears across resistor 83. But since $I_b$ of transistor 71 equals zero, current $I_4$ flowing out of the network at output terminal 91 must flow through resistor 83 with resistance $R_3$, thereby causing a voltage drop $I_4R_3$ in the direction as shown. As a result, since $V_3$ appears across resistor 83 in the opposite direction, $V_3=-I_4R_3$. Since this equation is equivalent to Equation 1 above, the circuit shown in FIG. 3 functions as a gyrator.

The circuit configurations shown in FIGS. 2 and 3 exactly satisfy Equations 1 and 2 above only because it was assumed that ideal transistors were used. As indicated above, both the input and output open circuit impedances for an ideal gyrator are equal to zero. In practical circuits, however, the characteristics of the ideal gyrator can only be approximated because of the finite amplification available in the real transistor. It has been found that both embodiments described above have low input and output impedances and therefore closely approximate the characteristics of an ideal gyrator. It may be noted in addition that the embodiment shown in FIG. 3 is particularly interesting from this standpoint because its input open circuit impedance is a negative resistance. Because of this, a small positive resistance may be connected in series with the input to tune out the negative resistance and arrive at a resultant input impedance that is very close to zero. As a result the network may be used to simulate very high quality inductors.

What is claimed is:

1. In a network containing first, second, third and fourth ports, each port having first and second terminals, apparatus which comprises:

- a plurality of transistors each having emitter, collector, and base electrodes;
- means connecting the collector of a first transistor to the base of a second transistor;
- means connecting the emitter of the first transistor to the emitter of a third transistor;
- means connecting the collector of the second transistor to the base of the third transistor;
- means connecting the collector of said first transistor to the first terminal of said first port;
- means connecting the emitter electrode of said second transistor to the first terminal of said second port;
- means connecting the collector of said third transistor to the first terminals of said third and fourth ports;
- means connecting the base of said first transistor to the second terminal of said first and third ports;
- means connecting emitter of said first transistor to the second terminal of said second port;
- means connecting the base of said third transistor to the second terminal of said fourth port;
- first impedance means connected across the terminals of one of said ports;
- second impedance means connected across the terminals of another of said ports so that gyrator action is produced between the remaining pair of ports.

2. A gyrator network having first and second input terminals and first and second output terminals, an input signal voltage $+V_1$ being supplied at said first input terminal with the respect to said second input terminal and an input signal current $I_1$ being supplied into said network at said first input terminal and out of said network at said second input terminal, an output signal voltage $+V_2$ being measured at said first output terminal with respect to said second output terminal and an output signal current $I_2$ being measured into said network at said first output terminal and out of said network at said second output terminal comprising in combination:

- first, second and third transistors each having emitter, collector and base electrodes;
- the base of said first transistor connected directly to the first terminal of said input port;
- first impedance means having a resistance $R_2$ connected between the base and collector electrodes of the first transistor so that substantially all of current $I_1$ at said first input terminal flows through said first impedance means;
- the base of said second transistor connected to the collector of said first transistor;
- the emitter of said second transistor connected to said second output terminal and the emitter of said first transistor connected to said first output terminal so that voltage $V_2$ at the output port appears across said first impedance means causing said voltage to follow the relationship, $$V_2=I_1R_2$$

- means connecting the base of said third transistor to the collector of said second transistor;
- second impedance means having a resistance $R_1$ connected between the base and collector electrodes of said third transistor such that substantially all of said current $I_2$ flowing out of said network at said second output terminal flows through said second transistor and through said second impedance means;

the emitter of said third transistor connected to the emitter of said first transistor so that voltage $V_1$ at said input port appears across said second impedance means, causing said voltage to follow the relationship, $$V_1=-I_2R_1$$

whereby gyrator action is produced between said input and output terminals.

3. A gyrator network having first and second input input terminals and first and second output terminals, an input signal voltage $+V_1$ being applied at said first input terminal with respect to said second input terminal and an input signal current $I_1$ being supplied into said network at said first input terminal and out of said network at said second input terminal, an output signal voltage $+V_1$ being measured at said first output terminal with respect to said second output terminal and an output signal current $I_2$ being measured into said network at said first output terminal and out of said network at said second output terminal comprising in combination:

first, second and third transistors each having emitter, collector and base electrodes;

means connecting the base of said first transistor to said first input terminal;

means connecting the collector of said second transistor to said first input terminal so that current $I_1$ substantially flows through said collector electrode of said second transistor;

a first impedance means having a resistance $R_2$ connected to the emitter of the second transistor for transmitting said current $I_1$ to the emitter electrodes of said first and third transistors;

means connecting the base of said first transistor to said second output terminal and means connecting the base of said second transistor to said first output terminal such that said output voltage $V_2$ substantially appears across said first impedance means causing said voltage to follow the relationship, $$V_2=I_1R_2$$

second impedance means having a resistance $R_1$ connecting said second output terminal to the collector of said third transistor such that said current $I_2$ flowing out of said network at said second output terminal substantially flows across said second impedance means;

means connecting said second impedance means and said collector of said third transistor to said second input terminal such that said input voltage $V_1$ substantially appears across said second impedance means causing said voltage to follow the relationship, $$V_1=-I_2R_1$$

whereby gyrator action is produced between said input and output terminals.

4. A gyrator network comprising in combination:

first, second and third transistors each having emitter, collector and base electrodes;

an input port having first and second input terminals;

an output port having first and second output terminals;

the base of said first transistor connected to said first input terminal;

the collector of said third transistor connected to said second input terminal;

the emitter electrodes of said first and third transistors connected to said first output terminal;

the emitter electrode of said second transistor connected to said second output terminal;

means connecting the collector of said first transistor to the base of said second transistor;

means connecting the collector of said second transistor to the base of said third transistor;

first impedance means connected between the base and collector electrodes of said first transistor;

and second impedance means connected between the base and collector electrodes of said third transistor, whereby gyrator acton is produced between said first input and output ports.

5. A gyrator network comprising in combination:

first, second and third transistors each having emitter, collector and base electrodes;

an input port first and second input terminals;

an output port having first and second output terminals;

the collector of said second transistor and the base of said third transistor connected to said first input terminal;

the collector of said third transistor connected to said second input terminal;

the collector of said first transistor and the base of said second transistor connected to said first output terminal;

the base of said first transistor connected to said second output terminal;

first impedance means connected between the base electrode of said first transistor and the collector electrode of said third transistor;

second impedance means connected from the emitter of said second transistor to the emitters of said first and third transistors, whereby gyrator action is produced between said input and output ports.

References Cited

UNITED STATES PATENTS 3,452,304 6/1969 Mitra ---------------- 333—80

HERMAN KARL SAALBACH, Primary Examiner

M. NUSSBAUM, Assistant Examiner

U.S. Cl. X.R.

330—12; 333—24